United States Patent
Sato et al.

(10) Patent No.: US 7,022,425 B2
(45) Date of Patent: Apr. 4, 2006

(54) ELECTRIC ENERGY GENERATING APPARATUS AND METHOD OF MANUFACTURING THE SAME

(75) Inventors: Nobuaki Sato, Kanagawa (JP); Takeaki Kozuka, Kanagawa (JP); Masataka Nakajin, Kanagawa (JP); Koji Shimotoku, Kanagawa (JP)

(73) Assignee: Sony Corporation, Tokyo (JP)

( * ) Notice: Subject to any disclaimer, the term of this patent is extended or adjusted under 35 U.S.C. 154(b) by 382 days.

(21) Appl. No.: 10/276,773

(22) PCT Filed: May 23, 2001

(86) PCT No.: PCT/JP01/04332

§ 371 (c)(1),
(2), (4) Date: Jan. 29, 2003

(87) PCT Pub. No.: WO01/91213

PCT Pub. Date: Nov. 29, 2001

(65) Prior Publication Data

US 2003/0152817 A1    Aug. 14, 2003

(30) Foreign Application Priority Data

May 24, 2000    (JP) .............................. 2000-153006

(51) Int. Cl.
*H01M 8/00*    (2006.01)

(52) U.S. Cl. .............................. 429/13; 429/34; 429/41

(58) Field of Classification Search .................. 429/13, 429/34, 41
See application file for complete search history.

(56) References Cited

U.S. PATENT DOCUMENTS 6,461,751 B1 * 10/2002 Boehm et al. ................ 429/13

FOREIGN PATENT DOCUMENTS

| | | |
|---|---|---|
| EP | 0 226 911 A1 | 7/1987 |
| EP | 0 589 535 A1 | 3/1994 |
| JP | 62-196389 | 8/1987 |
| JP | 6-103992 | 4/1994 |
| JP | 6-342667 | 12/1994 |
| JP | 7-147162 | 6/1995 |
| JP | 8-298128 | 11/1996 |
| JP | 11-135136 | 5/1999 |
| JP | 2000-215903 | 8/2000 |
| JP | 2000-510510 | 8/2000 |
| JP | 2001-135328 | 5/2001 |
| WO | WO 97/41168 | 11/1997 |

* cited by examiner

*Primary Examiner*—Dah-Wei Yuan
(74) *Attorney, Agent, or Firm*—Bell, Boyd & Lloyd LLC

(57) ABSTRACT

An electric energy generating apparatus configured to generate a desired electromotive force from hydrogen and oxygen is provided. The apparatus includes a hydrogen electrode film, an electrolyte film and an oxygen electrode film. The hydrogen electrode film, to which hydrogen is supplied, includes a catalyst layer containing a decomposing catalyst that decomposes hydrogen into protons and electrons. The electrolyte film includes a sheet having a plurality of voids. Oxygen is supplied to the oxygen electrode film. The voids in the electrolyte film are filled with proton-conducting material and/or the decomposing catalyst. This prevents the hydrogen from reaching the oxygen electrode film. When hydrogen is supplied to the hydrogen electrode film, the concentration of hydrogen of the oxygen electrode therefore decreased to such a value as required generating the desired electromotive force.

1 Claim, 9 Drawing Sheets

ELECTRIC ENERGY GENERATING APPARATUS AND METHOD OF MANUFACTURING THE SAME

RELATED APPLICATION DATA

The present application claims priority to Japanese Patent Application No. P2000-153006 filed on May 24, 2000, herein incorporated by reference.

BACKGROUND OF THE INVENTION

The present invention relates to an electric-energy generating apparatus and a method of manufacturing the same. More particularly, the invention relates to an electric energy generating apparatus including a hydrogen-electrode film and an oxygen-electrode film to which hydrogen and oxygen are supplied, respectively, and designed to generate a desired electromotive force, and to this electric energy generating apparatus.

In general, fossil fuel such as gasoline and light oil have been widely used as sources of energy not only in automobiles but also in generating electric power stations. Thanks to the use of fossil fuels, man could remarkably enhance the living standard and accomplished the industrial development. The use of fossil fuels, however, has created a menace of environmental destruction to the planet earth. The fossil fuels will exhaust in the future. A long stable supply of them has become questionable.

Water contains hydrogen. Hydrogen exits in unlimited abundance on the earth. A unit amount of hydrogen provides a large amount of chemical energy. When hydrogen is used as a source of energy, it does not release injurious materials, global warming gas or the like. Recently hydrogen has attracted much attention, as an inexhaustible source of energy.

Particularly in recent years, many research and development have been made of electric energy generating apparatuses that can extract electric energy from hydrogen. It is expected that the electric energy generating apparatuses be applied to large-scale power stations and on-site private power plants. Moreover, it is expected that the apparatuses be used as power sources in automobiles.

An electric energy generating apparatus, which is configured to extract electric energy from hydrogen, has a hydrogen electrode and an oxygen electrode, to which hydrogen and oxygen are supplied, respectively. The hydrogen supplied to the hydrogen electrode decomposes into protons and electrons due to the action of the catalyst used. The electrons are absorbed into the hydrogen electrode. The protons are brought to the oxygen electrode. The electrons absorbed into the hydrogen electrode are brought to the oxygen electrode via a load. On the other hand, the oxygen supplied to the oxygen electrode combine with the protons and electrons brought to it from the hydrogen electrode by virtue of the catalyst, generating water. An electromotive force is thus generated between the hydrogen electrode and the oxygen electrode. The electric energy generating apparatus therefore causes an electric current to flow through the load.

In the electric energy generating apparatus configured to extract electric energy from hydrogen, the hydrogen supplied to the hydrogen electrode decomposes into protons and electrons as described above, to generate an electromotive force between the hydrogen electrode and the oxygen electrode. At the oxygen electrode, the protons and the electrons, brought from the hydrogen electrode, must react to generate water. If the hydrogen supplied to the hydrogen electrode remains in a large amount at the oxygen electrode, not decomposed into protons and electrons, the hydrogen concentration will increase at the oxygen electrode. Consequently, at the oxygen electrode the same reaction will take place as at the hydrogen electrode. If the reaction at the oxygen electrode proceeds to the same extent as at the hydrogen electrode, the polarity of the electric energy generating apparatus decreases. In this case, the apparatus can no longer generate an electromotive force of the desired magnitude; it cannot function as a practical electric energy generating apparatus.

SUMMARY OF THE INVENTION

The present invention has been made in view of the foregoing. In general, the present invention provides a novel, electric energy generating apparatus having a hydrogen-electrode film and an oxygen-electrode film to which hydrogen and oxygen are supplied, respectively, and designed to generate a desired electromotive force.

An electric energy generating apparatus according to an embodiment of the present invention includes: a hydrogen electrode film to which hydrogen is supplied; an oxygen electrode film to which oxygen is supplied; and an electrolyte film interposed between the hydrogen electrode film and the oxygen electrode film. The concentration of hydrogen at the oxygen electrode film is at most about 3000 ppm when hydrogen is supplied to the hydrogen electrode film.

Since the concentration of hydrogen at the oxygen electrode film is at most about 3000 ppm when hydrogen is supplied to the hydrogen electrode film, the difference between the hydrogen concentration at the hydrogen electrode film and the hydrogen concentration at the oxygen electrode film is large enough to generate electric energy. Thus, the apparatus can generate electric energy in the form of an electromotive force of a desired magnitude.

In the present invention, in an embodiment the concentration of hydrogen at the oxygen electrode film is about 1000 ppm or less. If the concentration of hydrogen at the oxygen electrode film is about 1000 ppm or less when hydrogen is supplied to the hydrogen electrode film, the difference between the hydrogen concentration at the hydrogen electrode film and the hydrogen concentration at the oxygen electrode film is large enough to generate electric energy. Thus, the apparatus can efficiently generate electric energy in a desired amount.

Preferably, the concentration of hydrogen at the oxygen electrode film is about 100 ppm or less. If the concentration of hydrogen at the oxygen electrode film is about 100 ppm or less when hydrogen is supplied to the hydrogen electrode film, the difference between the hydrogen concentration at the hydrogen electrode film and the hydrogen concentration at the oxygen electrode film is greater, sufficient to generate electric energy. Hence, the apparatus can more efficiently generate electric energy in a desired amount.

The hydrogen electrode film preferably includes a layer containing a catalyst which decomposes at least the hydrogen supplied, into protons and electrons, and an electrode at which the electrons are collected. The electrode film includes a proton-conducting film which allows passage of at least the protons. The proton-conducting film may be formed by roller coating in which a glass rod 23 is rolled, applying, for example, a mixture solution of fullerenol and tetrahydrofuran. The proton-conducting film may be formed by other methods, such as spray coating, screen printing, sol-gel process or the like.

Preferably, the proton-conducting film has properties of suppressing passage of hydrogen. Having the properties, the film efficiently suppresses the passage of hydrogen. This effectively prevents the hydrogen from reaching the oxygen electrode film and helps to generate electric energy in the form of an electromotive force of a desired magnitude.

The proton-conducting film used in the present invention includes proton-conducting members made mainly of a fullerene derivative that has a group capable of releasing protons from the carbon atoms composing a fullerene molecule. The group that can release protons is —XH where X is an atom or an atom group having divalent bonds. Alternatively, the proton-releasing group may be —OH or —YH where Y is an atom or an atom group having divalent bonds. The proton-releasing group can include —OH, —OSO$_3$H, —COOH, —SO$_3$H and —OPO(OH)$_3$ and/or the like.

The fullerene derivative is, preferably, fullerene polyhydroxide fullerenol in an embodiment of the present invention.

The proton-conducting members contain, as main component, a fullerene derivative containing an electron-attracting group in addition to the proton-releasing group in an embodiment of the present invention.

The electron-attracting group may be nitro group, carbonyl group, carboxyl group, nytril group, alkyl halide group, a group containing a halogen atom and/or the like.

The proton-conducting film may contain proton-conducting members made of perfluorosulfonic acid resin, such as NAFION manufactured by DUPONT.

In the present invention, the term "fullerene molecule" means a spherical carbon cluster molecule that has 36, 60, 70, 78, 82, 84 or the like number of carbon atoms.

The oxygen electrode film includes an electrode to which at least electrons are supplied and a catalyst layer containing a catalyst that binds the oxygen supplied, the electrons supplied and the protons supplied.

An electric energy generating apparatus according to an embodiment of the present invention includes a hydrogen electrode film to which hydrogen is supplied and which includes a catalyst layer containing a decomposing catalyst that decomposes the hydrogen into protons and electrons; and an electrolyte film including a sheet which contains proton-conducting material and which has a plurality of voids; and an oxygen electrode film which oxygen is supplied. The voids in the electrolyte film are filled with the proton-conducting material and/or the decomposing catalyst. The term "voids" means openings such as holes.

In the electric energy generating apparatus according to an embodiment of the present invention, the electrolyte film includes a sheet having a plurality of voids. The electrolyte film can therefore have a desired physical strength. The voids made in the sheet hold the proton-conducting material and/or the decomposing catalyst. Hence, hydrogen is decomposed into protons and electrons. The protons can be supplied via the electrolyte film to the oxygen electrode film. Further, the hydrogen supplied to the hydrogen electrode film can be effectively prevented from reaching the oxygen electrode film after passing through the voids made in the sheet.

In the electric energy generating apparatus, the voids are filled with a proton-conducting material.

The electrolyte film includes at least one proton-conducting film which is provided on at least one surface of the sheet and which contains the proton-conducting material.

Since the electrolyte film includes at least one proton-conducting film which is provided on at least one surface of the sheet, the hydrogen supplied to the hydrogen electrode film can be reliably prevented from reaching the oxygen electrode film after passing through the voids made in the sheet.

A part of the catalyst layer containing the decomposing catalyst exists in the voids, and the voids are filled with the decomposing catalyst.

The electrolyte film includes at least one proton-conducting film containing the proton conducting catalyst and provided on that surface of the sheet which faces away from the hydrogen electron electrode film. This reliably prevents the hydrogen supplied to the hydrogen electrode film, from reaching the oxygen electrode film after passing through the voids made in the sheet.

A part of the catalyst layer containing the decomposing catalyst exists in the voids, and the voids are filled with the proton-conducting material and the decomposing catalyst.

The electrolyte film includes at least one proton-conducting film containing the proton-conducting catalyst and provided on that surface of the sheet which faces away from the hydrogen electron electrode film. Hence, the hydrogen supplied to the hydrogen electrode film can be reliably prevented from reaching the oxygen electrode film after passing through the voids made in the sheet.

The oxygen electrode film includes a catalyst layer containing a binding catalyst that binds oxygen, electrons and protons. The catalyst binds the oxygen with the protons and electrons supplied from the hydrogen electrode, generating water.

The sheet having voids is made of polypropylene, polyethylene and/or the like. The sheet is a porous film.

The proton-conducting material has properties of suppressing passage of hydrogen. The proton-conducting material contains fullerenol in an embodiment.

At least one of the hydrogen electrode film and oxygen electrode film is a carbon sheet.

At least one of the decomposing catalyst and binding catalyst contains platinum or a platinum alloy.

An electric energy generating apparatus according to an embodiment of the invention is manufactured by a method including the steps of: forming an electrolyte film by coating a sheet having many voids, with a coating liquid containing proton-conducting material; and interposing the electrolyte film between a hydrogen electrode film and an oxygen electrode film to which hydrogen and oxygen are supplied, respectively.

Since the electrolyte film is formed by coating a sheet having many voids, with a coating liquid containing proton-conducting material, and the electrolyte film is interposed between the hydrogen electrode film and the oxygen electrode film, the electric energy generating apparatus can have an electrolyte film having a desired physical strength.

The coating liquid contains about 25% to about 60% by weight of the proton-conducting material. Preferably, the coating liquid contains about 33% to about 50% by weight of the proton-conducting material. The proton-conducting material is made of fullerenol.

The sheet has voids whose opening ratio is 20 to 80%.

The step of forming an electrolyte film includes a step of coating both surfaces of the sheet with a coating liquid that contains proton-conducting material.

The step of forming an electrolyte film includes a step of coating, several times, at least one surface of the sheet with a coating liquid that contains proton-conducting material.

The method according to an embodiment the present invention further includes a step of coating a hydrogen electrode comprising a catalyst layer containing a decomposing catalyst that decomposes hydrogen into protons and electrons, thereby forming the hydrogen electrode film.

The coating liquid applied in the step of forming the hydrogen electrode film has been prepared to have a concentration of the proton-conducting material, which is lower than the concentration of the proton-conducting material contained in the coating liquid applied in the step of forming the electrolyte film.

The method according to an embodiment of the present invention further includes a step of coating an oxygen electrode including a catalyst layer containing a binding catalyst that binds oxygen, protons and electrons, thereby forming the oxygen electrode film.

The coating liquid applied in the step of forming the oxygen electrode film has been prepared to have a concentration of the proton-conducting material, which is lower than the concentration of the proton-conducting material contained in the coating liquid applied in the step of forming the electrolyte film.

The step of interposing the electrolyte film includes a step of pressing the electrolyte film held between the hydrogen electrode film and the oxygen electrode film.

Additional features and advantages of the present invention are described in, and will be apparent from, the following Detailed Description of the Invention and the figures.

DETAILED DESCRIPTION OF THE INVENTION

An electric energy generating apparatus and a method of manufacturing the same, both according to an embodiment of the invention, will be described with reference to the accompanying drawings.

Figure 1:
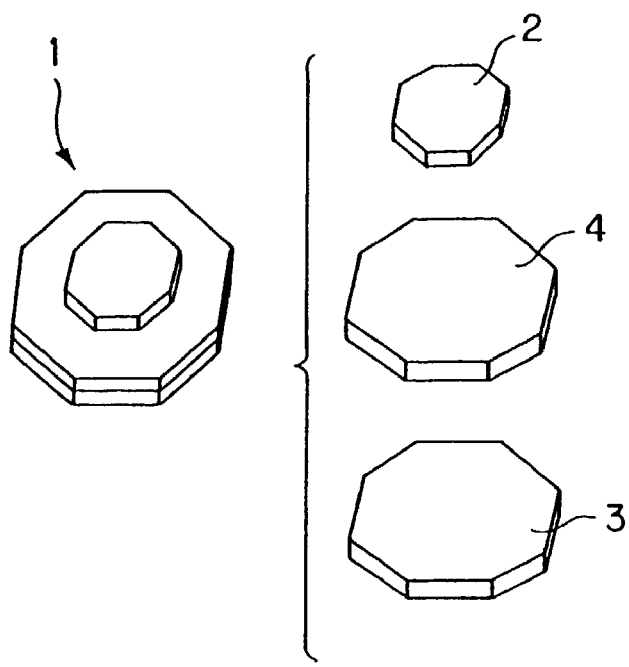
FIG. 1 is a perspective view illustrating an example of an electric energy generating apparatus according to an embodiment of the present invention.

As FIG. 1 shows, the electric energy generating apparatus 1 according to an embodiment of the present invention includes a hydrogen electrode film 2, an oxygen electrode film 3, and an electrolyte film 4. The electrolyte film 4 is sandwiched between the hydrogen electrode film 2 and the oxygen electrode film 3.

The hydrogen electrode film 2, oxygen electrode film 3 and electrolyte film 4 are octagonal plates. The hydrogen electrode film 2 has a width of about 21 mm. The oxygen electrode film 3 and the electrolyte film 4 have a width of about 32 mm. The hydrogen electrode film 2 and the oxygen electrode film 3 are about 240 µm thick. The electrolyte film 4 is about 50 µm thick. The shape, width and thickness of the hydrogen electrode film 2, those of the oxygen electrode film 3 and those of the electrolyte film 4 are not limited to the values exemplified above. Rather, any other shape, width and thickness may be selected for the hydrogen electrode film, oxygen electrode film and electrolyte film.

Figure 2:
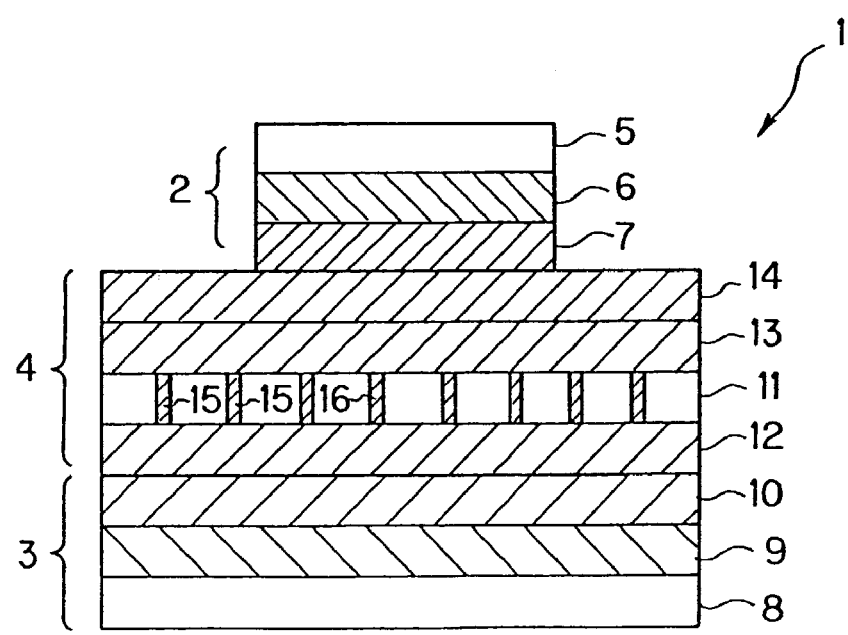
FIG. 2 is a sectional view showing the structure of a hydrogen electrode film, the structure of an oxygen electrode film, and the structure of an electrolyte film according to an embodiment of the present invention.

FIG. 2 illustrates the structures of the hydrogen electrode film 2, oxygen electrode film 3 and electrolyte film 4. As shown in FIG. 2, the hydrogen electrode film 2 is a three-layered member that is composed of an electrode 5, a catalyst layer 6, and a proton-conducting film 7. The electrode 5 is made of a carbon sheet. The catalyst layer 6 contains a platinum-containing catalyst and can decompose hydrogen into protons and electrons. The proton-conducting film 7 contains fullerenol. The oxygen electrode film 3 is a three-layered member that is composed of an electrode 8, a catalyst layer 9, and a proton-conducting film 10. The electrode 8 is made of a carbon sheet. The catalyst layer 9 contains a platinum-containing binding catalyst, and can combine oxygen, protons and electrons together. The proton-conducting film 10 contains fullerenol.

The electrolyte film 4 is a four-layered member that is composed of a sheet 11 and three proton-conducting films 12, 13 and 14. The sheet 11 is made of polypropylene. The films 12, 13 and 14 contain fullerenol. The sheet 11 serves as a support for the three proton-conducting films 12, 13 and 14.

The electrode 5 and catalyst layer 6 of the hydrogen electrode film 2 are formed integral with each other. They are configured to allow passage of at least hydrogen. The electrode 8 and catalyst layer 9 of the oxygen electrode film 3 are formed integral with each other and allows passage of at least oxygen and water.

The proton-conducting film 7, which is one component of the hydrogen electrode film 2 and contains fullerenol, the proton-conducting film 10, which is one component of the oxygen electrode film 3 and contains fullerenol, and the proton-conducting films 12, 13 and 14, which are three components of the electrolyte film 4 and contain fullerenol, allow passage of protons and shield hydrogen molecules.

The sheet 11 made of polypropylene has many holes 15. The holes 5 are filled with proton-conducting material 16 that contains fullerenol. The holes 15 are made in the sheet 11, with their total opening amounting to about 20% to about 80% of the surface area of the sheet 11. Like the proton-conducting films 7, 10, 12, 13 and 14, the proton-conducting material 16 containing fullerenol allows passage of protons and shields hydrogen molecules. The sheet 11 itself is made of material that would not allow passage of any substance.

The electric energy generating apparatus 1, thus constructed, is used, shielded within a container (not shown). To generate electric energy, hydrogen and oxygen are supplied to the hydrogen electrode film 2 and the oxygen electrode film 3, respectively. Preferably, the hydrogen supplied may be released from hydrogen-occluding carbonaceous material (not shown) or hydrogen-occluding alloy (not shown, either) and applied to the hydrogen electrode film 2. The oxygen can be supplied to the oxygen electrode film 3 by supplying air.

The hydrogen supplied to the hydrogen electrode film 2 is decomposed into protons and electrons, by virtue of the catalyst layer 6. The protons are supplied to the electrolyte film 4 through the proton-conducting film 7, while the electrons are collected at the electrode 5. The electrons collected at the electrode 5 are supplied to the load (not shown).

By contrast, the protons that have reached to the electrolyte film 4 move to the oxygen electrode film 3, passing through the proton-conducting films 14 and 13, proton-conducting material 16 and proton-conducting film 12 that constitute the electrolyte film 4. The protons that have reached the oxygen electrode film 3 move through the proton-conducting film 10 of the oxygen electrode film 3 and reach the catalyst layer 9.

Oxygen is supplied to the oxygen electrode film 3, and electrons are supplied via the load (not shown) to the electrode 8 of the oxygen electrode film 3. As a result, the protons supplied through the proton-conducting film 10, the electrons supplied from the electrode 8 and the oxygen supplied externally combine due to the binding catalyst contained in the catalyst layer 9. Water is thereby generated. The water is discharged to the outside through the electrode 8.

An electromotive force is thereby generated between the electrode 5 and the electrode 8. An electric current therefore flows in the load (not shown).

In the electric energy generating apparatus 1 according to an embodiment of the present invention, the proton-conducting films 7, 12, 13 and 14 containing fullerenol, the proton-conducting material 16 containing fullerenol, and the sheet 11 made of polypropylene prevent the hydrogen supplied to the hydrogen electrode film 2 from reaching the oxygen electrode film 3. This maintains the hydrogen concentration at the oxygen electrode film 3 at about 3000 ppm or less, preferably about 1000 ppm or less, or more preferably about 100 ppm or less, when hydrogen is supplied to the hydrogen electrode film 2.

The catalyst contained in the catalyst layer 9 causes the same reaction at the oxygen electrode film 3 as the reaction occurring at the hydrogen electrode film 2, preventing the hydrogen from decomposing into protons and electrons. The apparatus can therefore function as an electric energy generating apparatus.

The electric energy generating apparatus 1 according to an embodiment of the present invention can be manufactured as will be described below. The numerical values referred to in the following description are provided as examples. The present invention is not limited to the numerical values.

Figure 3:
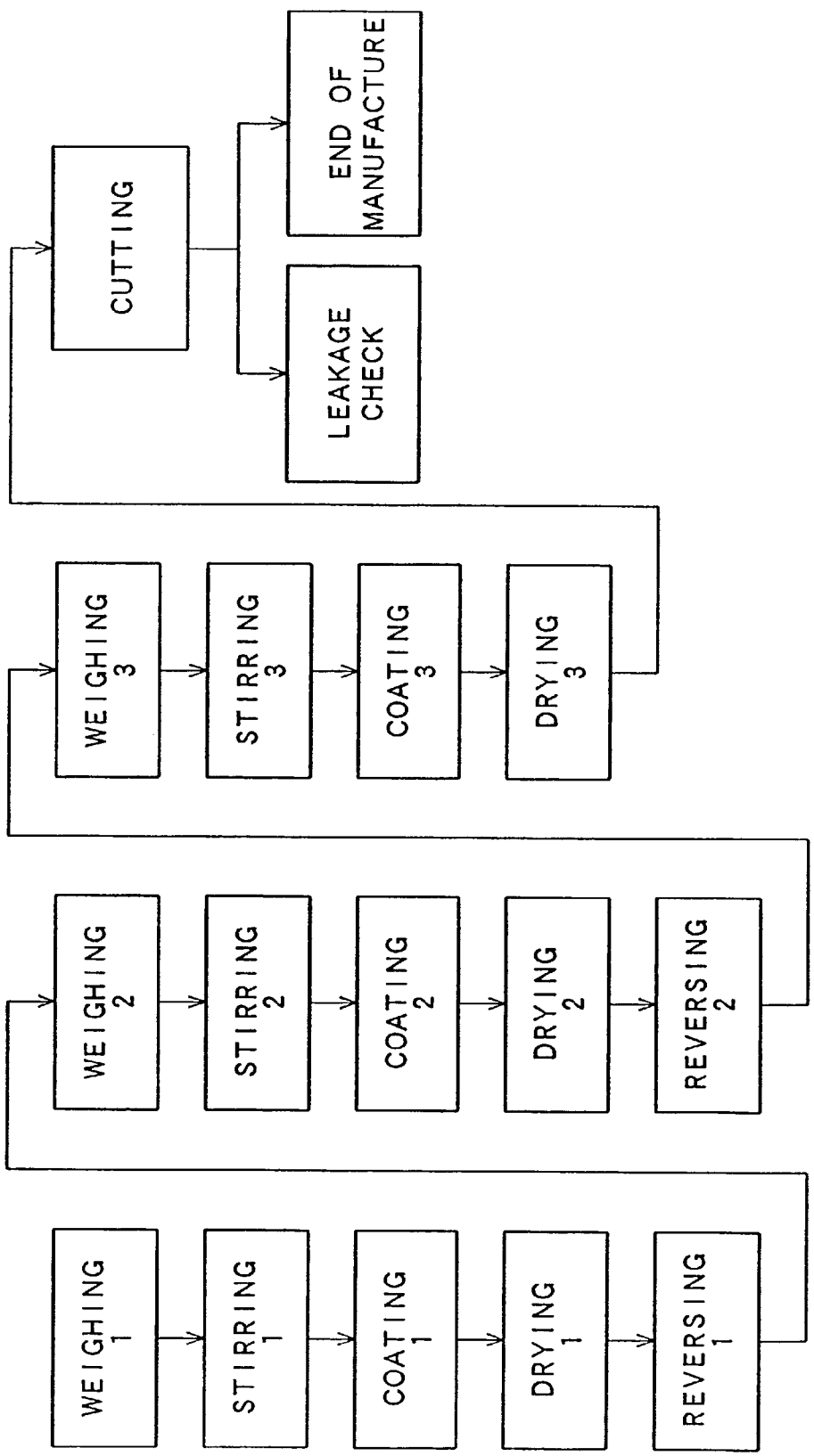
FIG. 3 is a flowchart showing the steps of manufacturing the electrolyte film according to an embodiment of the present invention.

FIG. 3 is a flowchart showing the steps of manufacturing the electrolyte film 4.

To manufacture the electrolyte film 4, 0.5 g of fullerenol powder and 1.0 g of tetrahydrofuran liquid are first weighed and prepared. Then, these substances are mixed in a container, thus preparing a mixture solution containing 33% by weight of fullerenol (weighing step 1).

Next, the container holding the mixture solution thus prepared is immersed in the tank of an ultrasonic washing machine, each time for three minutes. The mixture solution is thereby stirred (stirring step 1). The sheet 11 is prepared and coated with the mixture solution stirred (coating step 1).

FIGS. 4 to 7 are perspective views illustrating various methods of coating the sheet 11 with the mixture solution of fullerenol and tetrahydrofuran.

Figure 4:
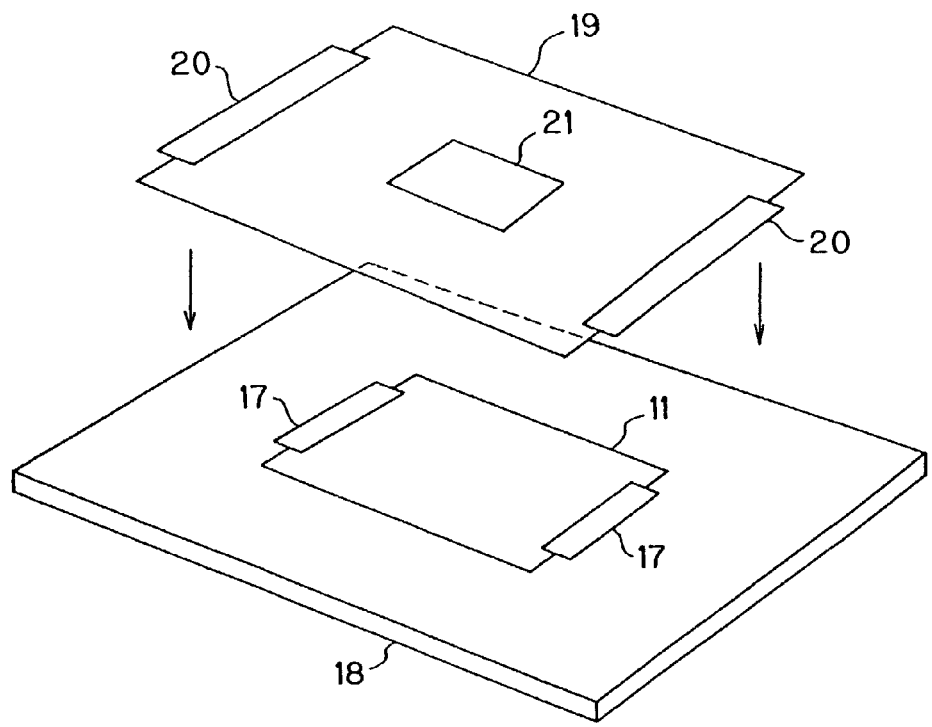
FIG. 4 is a perspective view illustrating an example of the step of applying a mixture of fullerenol and tetrahydrofuran to a sheet according to an embodiment of the present invention.

As FIG. 4 illustrates, a sheet 11 is fixed on a glass plate 18, by using pieces 17 of fixing tape.

Figure 5:
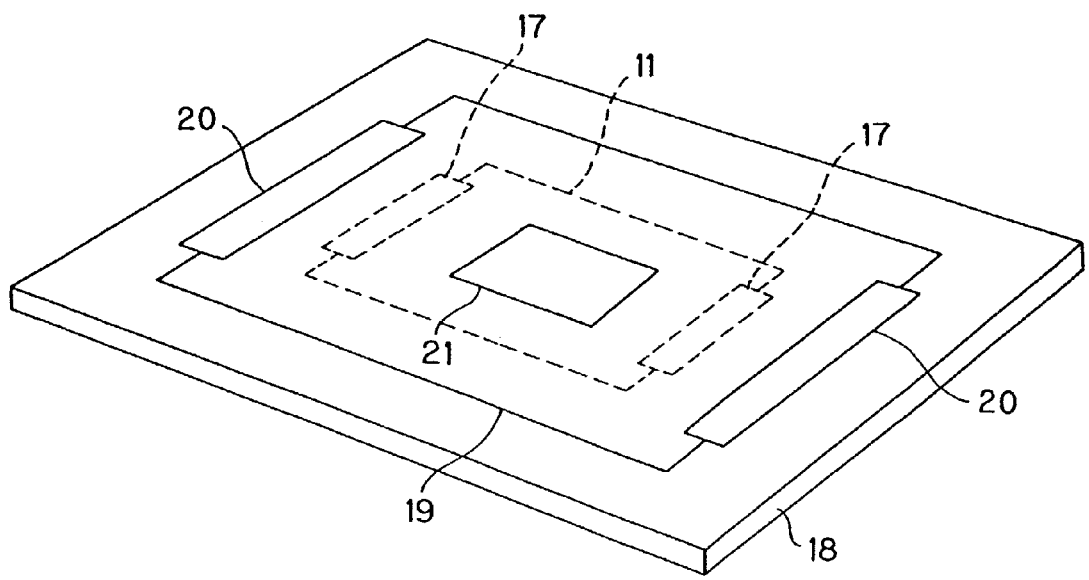
FIG. 5 is a perspective view showing another example of the step of applying a mixture of fullerenol and tetrahydrofuran to a sheet according to an embodiment of the present invention.

As shown in FIG. 4, a mask 19 is fixed on a glass plate 18, on which the sheet 11 has been placed, by using pieces 20 of fixing tape. As FIG. 4 shows, the mask 19 is larger than the sheet 11 and has an opening 21 in its center part. The opening 21 is smaller than the sheet 11. FIG. 5 illustrates the mask 19 thus fixed on the glass plate 18.

Figure 6:
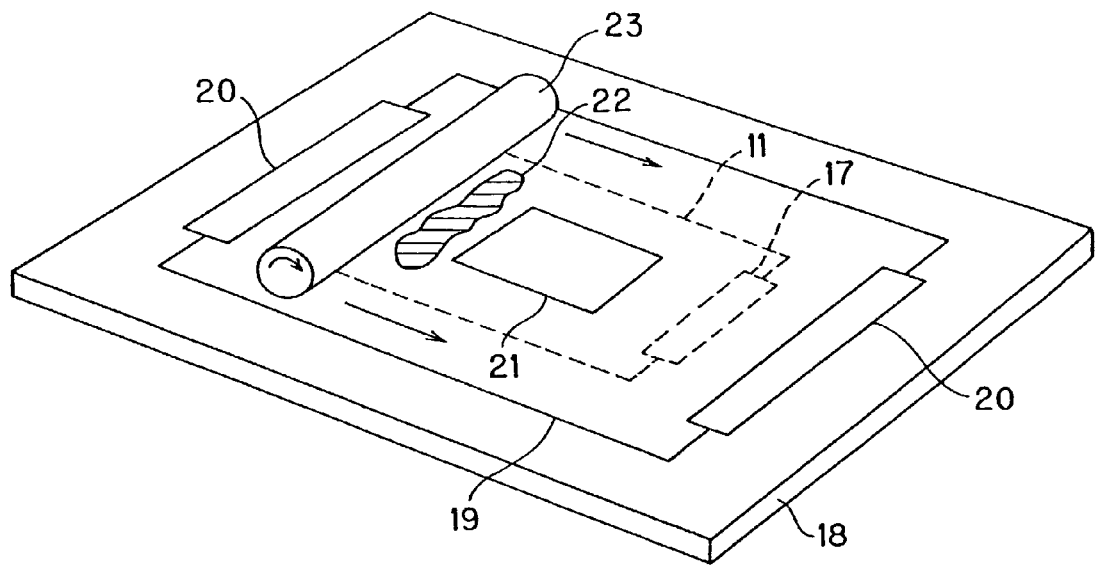
FIG. 6 is a perspective view depicting a further example of the step of applying a mixture of fullerenol and tetrahydrofuran to a sheet according to an embodiment of the present invention.

As shown in FIG. 6, the mixture solution of fullerenol and tetrahydrofuran, which has been stirred as described above, is dripped in an amount of 0.7 cm$^3$, onto that part of the mask 19 fixed on the glass plate 18 which lies adjacent to the opening 21.

Figure 7:
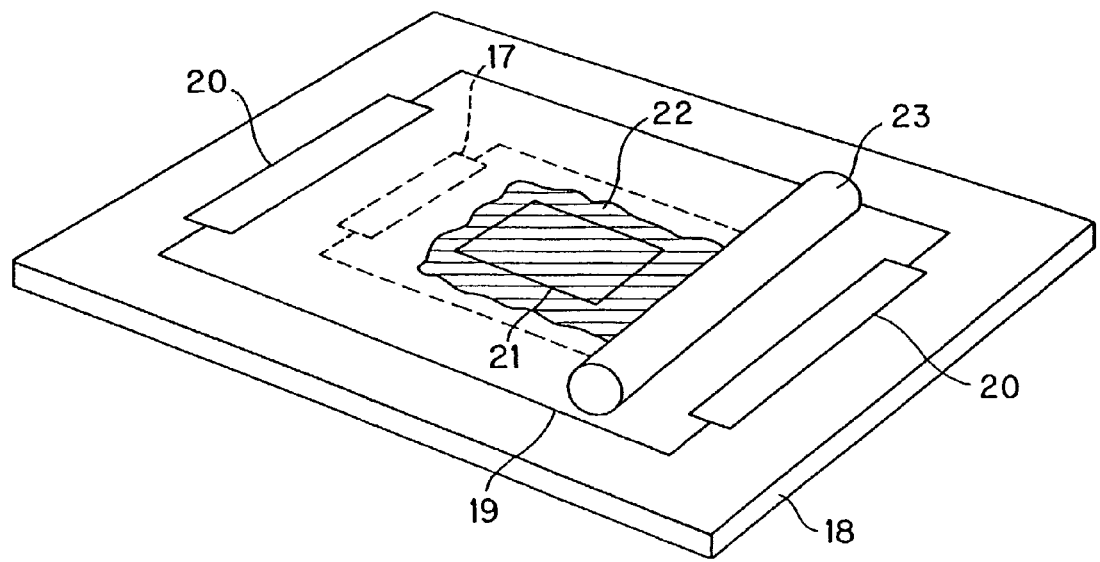
FIG. 7 is a perspective view showing another example of the step of applying a mixture of fullerenol and tetrahydrofuran to a sheet according to an embodiment of the present invention.

Then, a glass rod 23 is prepared and put on the mask 10 fixed on the glass plate 18. The glass rod 23 is rolled on the mask 10 at a speed of 10 mm/sec. That region of the mask 19 on which the glass rod 23 has been rolled is coated with a thin layer of the mixture solution 22 of fullerenol and tetrahydrofuran. FIG. 7 shows the mask that has been coated with the mixture solution 22 of fullerenol and tetrahydrofuran by the use of the glass rod 23.

Next, the glass rod 23 is removed from the mask 19, and the mixture solution of fullerenol and tetrahydrofuran is dried for 15 minutes (drying step 1). Most of tetrahydrofuran is thereby evaporated and only fullerenol remains on the mask 19.

The steps performed to form a proton-conducting material 16 as described form the fullerenol containing proton-conducting film 13 on one surface of the sheet 11 and fill fullerenol in the numerous holes 15 made in the sheet 11.

Further, the sheet 11 is turned over (reversing step 1). The sheet 11 is secured to the glass plate 18 by using pieces 17 of fixing tape, such that the surface on which the film 13 is provided contacts the glass plate 18.

The mask 10 is secured to the glass plate 18 to which the sheet 11 is now fixed, by using the pieces 20 of fixing tape. Then, an amount of the mixture solution of fullerenol and tetrahydrofuran is weighed (weighing step 2) and stirred (stirring step 2). The mixture solution 22 of fullerenol and tetrahydrofuran is dripped onto that part of the mask 10 which lies adjacent to the opening 21. The glass rod 23 is rolled on the mask 10, thereby coating the mask 19 with the mixture solution of fullerenol and tetrahydrofuran (coating step 2).

The mixture solution 22 of fullerenol and tetrahydrofuran is dried for 15 minutes (drying step 2). Most of tetrahydrofuran is thereby evaporated and only fullerenol remains on the mask 19.

The steps described above form the fullerenol containing proton-conducting film 12 on the other surface of the sheet 11.

The sheet 11 is turned over again (reversing step 2). The sheet 11 is secured to the glass plate 18 by using pieces 17 of fixing tape, such that the surface on which the film 12 is provided contacts the glass plate 18.

Further, the mask 10 is again secured to the glass plate 18 to which the sheet 11 is now fixed, by using the pieces 20 of fixing tape. Then, an amount of the mixture solution 22 of fullerenol and tetrahydrofuran is weighed (weighing step 3). The mixture solution 22 of fullerenol and tetrahydrofuran is stirred (stirring step 3) and dripped onto that part of the mask 10 which lies adjacent to the opening 21. The glass rod 23 is rolled, thereby coating the mask 19 with the mixture solution of fullerenol and tetrahydrofuran (coating step 3).

Next, the mixture solution 22 of fullerenol and tetrahydrofuran is dried for 15 minutes (drying step 3). Most of tetrahydrofuran is thereby evaporated, and only fullerenol remains on the mask 19.

The steps described above form the proton-conducting film 14 containing fullerenol, on said one surface of the sheet 11.

The sheet 11 now with the proton-conducting films 12, 13 and 14 provided on it is cut by a cutting machine (not shown), into an octagonal plate (cutting step). The electrolyte film 4 is thereby prepared.

The electrolyte film 4 thus made is subjected to leakage check (leakage check) as will be described below, in order to determine the hydrogen-shielding ability of the film 4.

Figure 8:
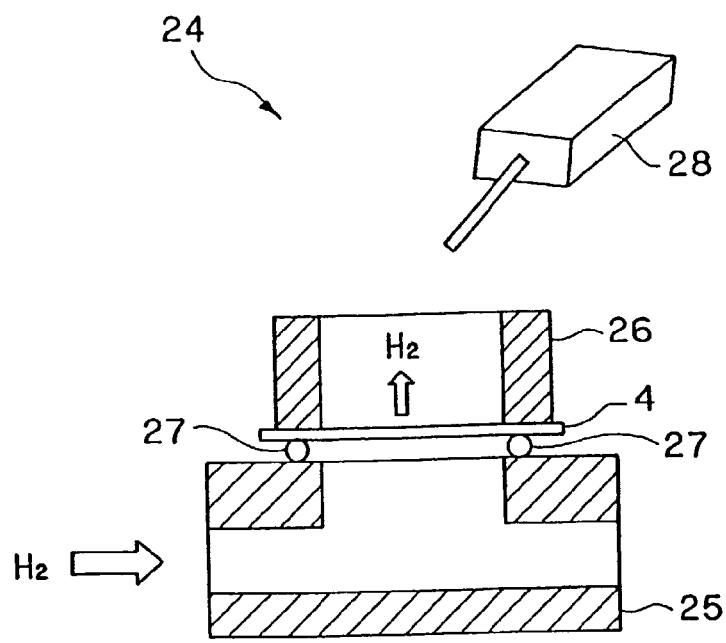
FIG. 8 is a sectional view showing a leakage checking apparatus for performing a leakage check according to an embodiment of the present invention.

FIG. 8 is a sectional view showing the leakage checking apparatus 24 that is used to perform the leakage check.

As shown in FIG. 8, the leakage checking apparatus 24 includes a hydrogen-introducing section 25, a hydrogen-receiving section 26, a seal 27, and a hydrogen concentration meter 28. Hydrogen is supplied into the hydrogen-introducing section 25. After passing through the electrolyte film 4, the hydrogen flows into the hydrogen-receiving section 26. The seal 27 maintains an airtight junction between the hydrogen-introducing section 25 and the electrolyte film 4. The hydrogen concentration meter 28 measures the concentration of the hydrogen supplied into the hydrogen-receiving section 26.

The hydrogen-introducing section 25 has a flow path through which hydrogen flows from a hydrogen-supplying section (not shown). The hydrogen-receiving section 26 is shaped like a ring having an octagonal cross section that conforms to the shape of the electrolyte film 4. The space defined by the ring having the octagonal cross section servers as a flow path for the hydrogen that has passed through the electrolyte film 4. The seal 27 is shaped like a ring and has an octagonal cross section and that conforms to the shape of the electrolyte film 4, too.

The leakage checking apparatus 24 performs the leakage check on the electrolyte film 4 in the following way.

At first, hydrogen is introduced for into the flow path of the hydrogen-introducing section 25 at the rate of about 20 $cm^3$/min. One minute later, the hydrogen concentration meter 28 measures the concentration of the hydrogen existing in the flow path of the hydrogen-receiving section 26. In the present invention, the electrolyte film 4 is determined to be non-defective if the hydrogen concentration measured by the meter 28 is about 100 ppm or less. The electrolyte film 4 is considered defective if the hydrogen concentration exceeds 100 ppm.

If the electrolyte film 4 is found non-defective, all other electrolyte films produced under the same conditions as the electrolyte film 4 are considered to be non-defective (end-of-manufacture step). If the electrolyte film 4 is determined to be defective, all other electrolyte films produced under the same conditions as the electrolyte film 4 are considered defective.

Figure 9:
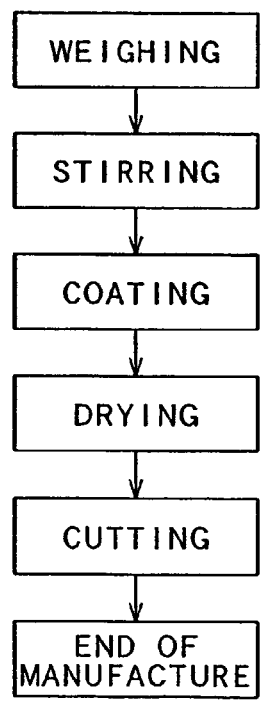
FIG. 9 is a flowchart illustrating the steps of manufacturing a hydrogen electrode film and an oxygen electrode film according to an embodiment of the present invention.

FIG. 9 is a flowchart illustrating the steps of manufacturing the hydrogen electrode film 2 and the oxygen electrode film 3.

To manufacture the hydrogen electrode film 2 and the oxygen electrode film 3, 0.2 g of fullerenol powder and 1.8 g of tetrahydrofuran liquid are weighed and mixed in a container, thus preparing a mixture solution that contains about 10% by weight of fullerenol (weighing step).

Next, the container holding the mixture solution is kept immersed in the tank of an ultrasonic washing machine, for three minutes. The mixture solution is thereby stirred (stirring step).

A sheet comprising an electrode and a catalyst layer that are formed integral is prepared. This sheet is coated with the mixture solution that has been stirred as described above (coating step). The sheet is coated in the same way as has been explained with reference to FIGS. 4 to 7. That is, the sheet composed of the electrode and the catalyst layer is secured to a glass plate 18 by using pieces 17 of fixing tape, such that the electrode contacts the glass plate 18.

Then, a mask 10 is prepared and is fixed on the glass plate 18 by using pieces 20 of fixing tape. On the glass plate 18, the sheet composed of the electrode and the catalyst layer has been placed. As has been described, the mixture solution 22 of fullerenol and tetrahydrofuran is dripped, in an amount of 0.7 $cm^3$, onto that part of the mask 19 which lies adjacent to the opening 21. A glass rod 23 is rolled on the mask 19 fixed to the glass plate 18 at the speed of about 10 mm/sec. The region on which the glass rod 23 has been rolled is thereby coated with a thin layer of the mixture solution of fullerenol and tetrahydrofuran, which has a uniform thickness.

Next, the glass rod 23 is removed from the mask 19, and the mixture solution 22 of fullerenol and tetrahydrofuran is dried for 15 minutes (drying step). Most of tetrahydrofuran is thereby evaporated and only fullerenol remains on the mask 19.

The steps described above form a proton-conducting film containing fullerenol, on the catalyst layer of the sheet composed of the electrode and the catalyst.

The sheet is cut by a cutting machine (not shown), into such an octagonal plate as shown in FIG. 1 (cutting step).

The hydrogen electrode film 2 and the oxygen electrode film 3 are thereby produced (end-of-manufacture step).

The electrolyte film 4, hydrogen electrode film 2 and oxygen electrode film 3, thus made, are laid one upon another in the order they are shown in FIG. 1. They are pressed together by means of a press.

Figure 10:
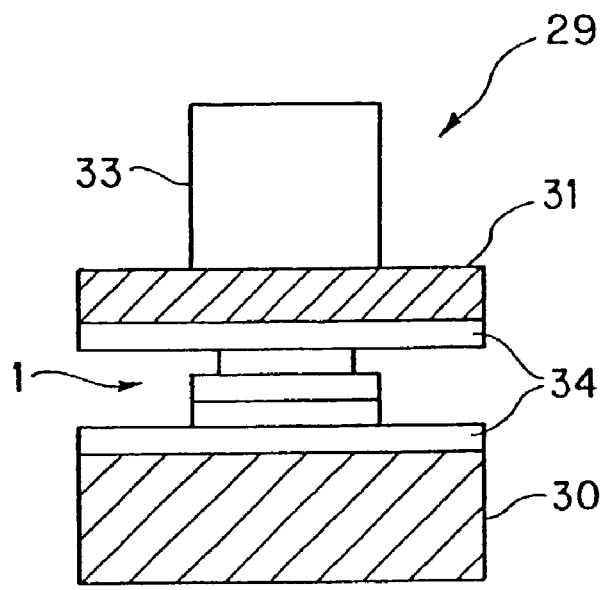
FIG. 10 is a sectional view of a press for performing a press working according to an embodiment of the present invention.

FIG. 10 shows the press 20. As FIG. 10 shows, the press 20 includes a lower platen 30, an upper platen 31 and a press mechanism 33. The lower platen 30 and the upper platen 31 have a glass plate 34 each.

The electrolyte film 4, hydrogen electrode film 2 and oxygen electrode film 3 are laid one upon another in the order they are shown in FIG. 1, on the glass plate 34 placed on the lower platen 30 of the press 29. The press mechanism 33 presses the glass plate 34 provided on the upper platen 31, onto the electrolyte film 4, hydrogen electrode film 2 and oxygen electrode film 3. At this time, a pressure of, for example, 500 kg/cm$^2$ is applied to the electrolyte film 4, hydrogen electrode film 2 and oxygen electrode film 3.

This press working compresses the electrolyte film 4, hydrogen electrode film 2 and oxygen electrode film 3, rendering them thinner and increasing the fullerenol concentration in the proton-conducting films. Hence, the hydrogen concentration at the oxygen electrode film 3 will more decrease than otherwise when hydrogen is supplied to the hydrogen electrode film 2.

The electrolyte film 4, hydrogen electrode film 2 and oxygen electrode film 3 are thus pressed, whereby the electric energy generating apparatus 1 of the invention is manufactured.

In the electric energy generating apparatus 1 thus manufactured, hydrogen and oxygen are supplied to the hydrogen electrode film 2 and the oxygen electrode film 3, respectively. An electromotive force is thereby generated between the electrode 5 and the electrode 8. The hydrogen supplied to the hydrogen electrode film 2 is prevented from reaching the oxygen electrode film 3, by the proton-conducting films 7, 10, 12, 13 and 14, each containing fullerenol, the proton-conducting material 16 containing fullerenol and the sheet 11 made of polypropylene. As a result, the hydrogen concentration at the oxygen electrode film 3 can be maintained at about 3000 ppm or less, preferably about 1000 ppm or less, or more preferably about 100 ppm or less. This can effectively prevent the same reaction from taking place at the oxygen electrode film 3, as at the hydrogen electrode film 2. That is, the catalyst layer 9 can efficiently prevent hydrogen from decomposing into protons and electrons. The electric energy generating apparatus 1 of the invention can therefore completely function as a practical electric energy generating apparatus.

Figure 11:
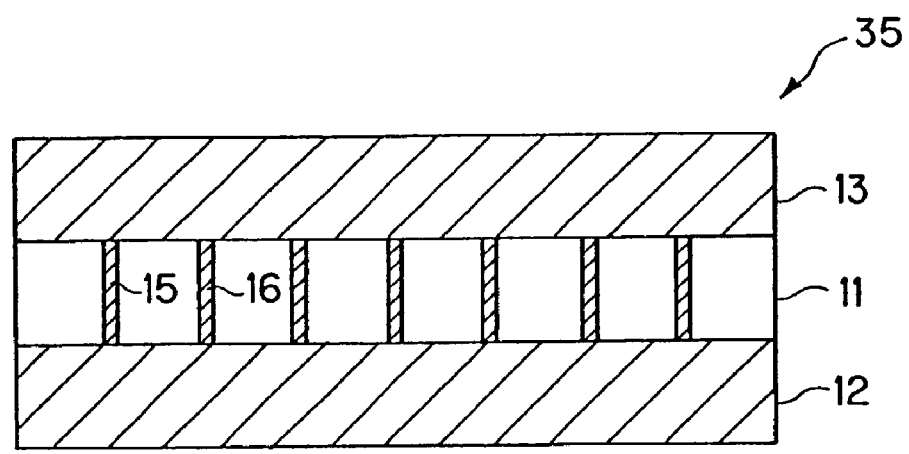
FIG. 11 is a sectional view showing another example of the electrolyte film incorporated in the electric energy generating apparatus according to an embodiment of the present invention.

FIG. 11 shows another example of the electric energy generating apparatus according to the present invention. The electric energy generating apparatus 1 shown in FIG. 11 differs from the apparatus 1 illustrated in FIG. 1, with regard to the structure of the electrolyte film 35.

The electrolyte film 35 shown in FIG. 11 is identical in structure to the electrolyte film 4 of FIG. 4, except that it has no component equivalent to the proton-conducting film 14. The electrolyte film 35 is a three-layered member composed of a sheet 11 made of polypropylene and two proton-conducting films 12 and 13 containing fullerenol.

The sheet 11 made of polypropylene has many holes 15. The holes 15 are filled with proton-conducting material 16 that contains fullerenol. In the electric energy generating apparatus 1 of the invention, the electrolyte film 35 is held between the hydrogen electrode film 2 and the oxygen electrode film 3.

The method of producing the electrolyte film 35 is identical to the method of the electrolyte film 4, except that the step of forming the proton-conducting film 14 (i.e., reversing step 2 to drying step 3) are not performed. Therefore, it will not be explained how the electrolyte film 35 is manufactured.

In the electric energy generating apparatus shown in FIG. 11, too, hydrogen and oxygen are supplied to the hydrogen electrode film 2 and the oxygen electrode film 3, respectively, thereby generating an electromotive force between the electrode 5 and the electrode 8. The hydrogen supplied to the hydrogen electrode film 2 is prevented from reaching the oxygen electrode film 3, by the proton-conducting films 7, 10, 12 and 13, each containing fullerenol, the proton-conducting material 16 containing fullerenol and the sheet 11 made of polypropylene. The hydrogen concentration at the oxygen electrode film 3 can therefore be maintained at about 3000 ppm or less, preferably about 1000 ppm or less, or more preferably about 100 ppm or less. This can effectively prevent the same reaction from taking place at the oxygen electrode film 3, as at the hydrogen electrode film 2. That is, the catalyst layer 9 can efficiently prevent hydrogen from decomposing into protons and electrons.

Figure 12:
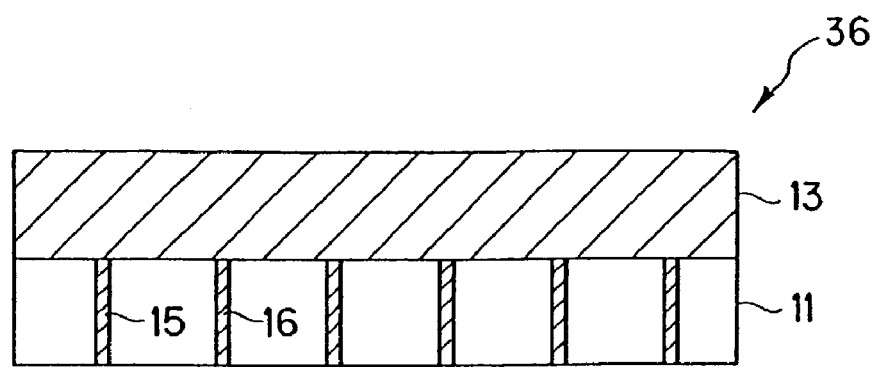
FIG. 12 is a sectional view depicting another example of the electrolyte film incorporated in the electric energy generating apparatus according to an embodiment of the invention.

FIG. 12 depicts an electrolyte film 36 for use in another electric energy generating apparatus according to the invention. As shown in FIG. 12, the electrolyte film 36 is of the same structure as the electrolyte film 4 of FIG. 4, except that it comprises neither the proton-conducting film 12 nor the proton-conducting film 14. The electrolyte film 36 is a two-layered member composed of a sheet 11 made of polypropylene and a proton-conducting film 13 containing fullerenol. The sheet 11 made of polypropylene has many holes 15. The holes 15 are filled with proton-conducting material 16 that contains fullerenol. In the electric energy generating apparatus incorporating the electrolyte film 36, the electrolyte film 36 is held between the hydrogen electrode film 2 and the oxygen electrode film 3.

The method of producing the electrolyte film 36 is identical to the method of the electrolyte film 4, except that the step of the proton-conducting films 12 and 14 (i.e., reversing step 1 to drying step 3) are not performed. Therefore, it will not be explained how the electrolyte film 36 is manufactured.

In this electric energy generating apparatus according to an embodiment of the present invention, hydrogen and oxygen are supplied to the hydrogen electrode film 2 and the oxygen electrode film 3, respectively, thereby generating an electromotive force between the electrode 5 and the electrode 8. The hydrogen supplied to the hydrogen electrode film 2 is prevented from reaching the oxygen electrode film 3, by the proton-conducting films 7, 10 and 13, each containing fullerenol, the proton-conducting film 16 containing fullerenol and the sheet 11 made of polypropylene. The hydrogen concentration at the oxygen electrode film 3 can therefore be maintained at about 3000 ppm or less, preferably about 1000 ppm or less, or more preferably about 100 ppm or less. This can effectively prevent the same reaction from taking place at the oxygen electrode film 3, as at the hydrogen electrode film 2. In other words, the catalyst layer 9 can efficiently prevent hydrogen from decomposing into protons and electrons.

Figure 13:
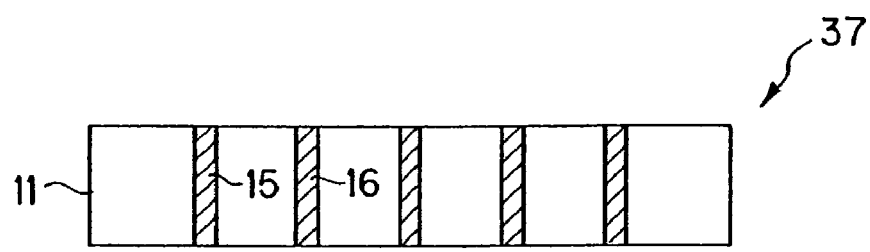
FIG. 13 is a sectional view depicting a further example of the electrolyte film incorporated in the electric energy generating apparatus according to an embodiment of the invention.

FIG. 13 illustrates an electrolyte film 37, which is incorporated in another electric energy generating apparatus according to the present invention. As seen from FIG. 13, the electrolyte film 37 is identical in structure to the electrolyte film 4, except that it does not have the proton-conducting film 12, 13 or 14. The film 37 is a one-layered member composed of a sheet 11 that is made of polypropylene. The sheet 11 made of polypropylene has many holes 15. The holes 15 are filled with proton-conducting material 16 that contains fullerenol. In the electric energy generating apparatus incorporating the electrolyte film 37, the electrolyte film 37 is held between the hydrogen electrode film 2 and the oxygen electrode film 3.

In this electric energy generating apparatus having the electrolyte film 37, too, hydrogen and oxygen are supplied to the hydrogen electrode film 2 and the oxygen electrode film 3, respectively, thereby generating an electromotive force between the electrode 5 and the electrode 8. The hydrogen supplied to the hydrogen electrode film 2 is prevented from reaching the oxygen electrode film 3, by the proton-conducting films 7 and 10, each containing fullerenol, the proton-conducting material 16 containing fullerenol and the sheet 11 made of polypropylene. As a result, the hydrogen concentration at the oxygen electrode film 3 can be maintained at about 3000 ppm or less, preferably about 1000 ppm or less, or more preferably about 100 ppm or less. This can effectively prevent the same reaction from taking place at the oxygen electrode film 3, as at the hydrogen electrode film 2. Namely, the catalyst layer 9 can efficiently prevent hydrogen from decomposing into protons and electrons.

Figure 14:
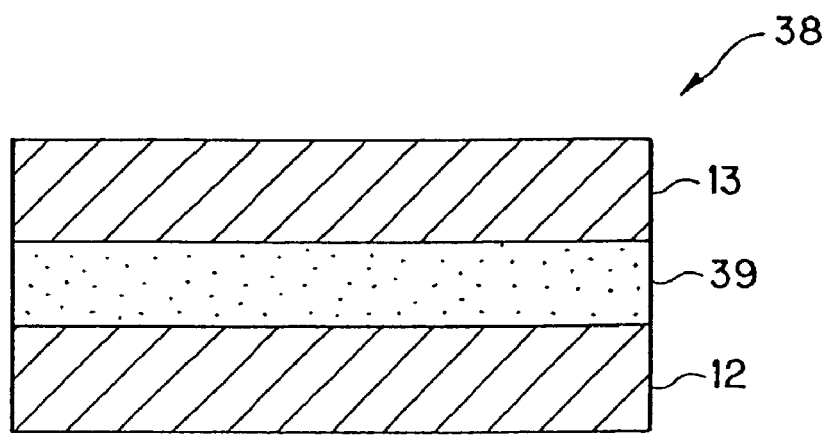
FIG. 14 is a sectional view illustrating another example of the electrolyte film incorporated in the electric energy generating apparatus according to an embodiment of the present invention.

FIG. 14 shows an electrolyte film 38, which is incorporated in a further electric energy generating apparatus according to this invention. As seen from FIG. 14, the electrolyte film 38 is a three-layered member composed of two proton-conducting films 12 and 13 and one porous film 39 sandwiched between the films 12 and 13. The porous film 39 has many holes (not shown) that extend from one surface to the other surface. The holes are filled with proton-conducting material (not shown). In the electric energy generating apparatus incorporating the electrolyte film 38, the electrolyte film 38 is held between the hydrogen electrode film 2 and the oxygen electrode film 3.

In the electric energy generating apparatus having the electrolyte film 38, hydrogen and oxygen are supplied to the hydrogen electrode film 2 and the oxygen electrode film 3, respectively, thereby generating an electromotive force between the electrode 5 and the electrode 8. The hydrogen supplied to the hydrogen electrode film 2 is prevented from reaching the oxygen electrode film 3, by the proton-conducting films 7, 10, 12 and 10, each containing fullerenol, and the proton-conducting material filled in the holes of the porous film 30. As a result, the hydrogen concentration at the oxygen electrode film 3 can be maintained at about 3000 ppm or less, preferably about 1000 ppm or less, or more preferably about 100 ppm or less. This can effectively prevent the same reaction from taking place at the oxygen electrode film 3, as at the hydrogen electrode film 2. That is, the catalyst layer 9 can efficiently prevent hydrogen from decomposing into protons and electrons.

Figure 15:
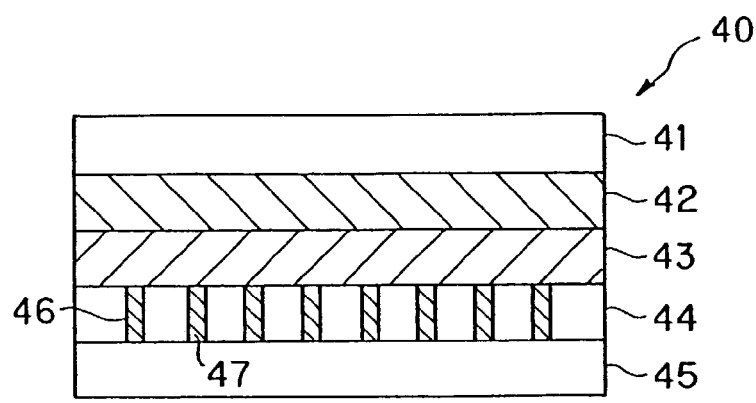
FIG. 15 is a sectional view showing another example of the electric energy generating apparatus according to an embodiment of the present invention.

FIG. 15 shows another electric energy generating apparatus 40 according to the present invention. The electric energy generating apparatus 40 shown in FIG. 15 comprises a hydrogen electrode 41 made of carbon, a catalyst layer 42 contains a catalyst including platinum, a proton-conducting film 43, a sheet 44 made of polypropylene, and an oxygen electrode 45 formed of a carbon sheet. The sheet 44 made of polypropylene has many holes 46. The holes 46 are filled with a catalyst 47 containing platinum.

The electric energy generating apparatus 40 thus configured is shielded within a container (not shown). To generate electric energy, hydrogen and oxygen are supplied to the hydrogen electrode 41 and the oxygen electrode 45, respectively. Preferably, the hydrogen supplied may be released from hydrogen-occluding carbonaceous material (not shown) or hydrogen-occluding alloy (not shown, either) and applied to the hydrogen electrode 41. The oxygen can be supplied to the oxygen electrode 45 by supplying air. The hydrogen supplied to the hydrogen electrode 41 is decomposed into protons and electrons, by virtue of the catalyst contained in the catalyst layer 42. The protons are supplied to the catalyst 47 filled in the numerous holes 46, through the proton-conducting film 43, while the electrons are collected at the electrode 41.

The electrons collected at the hydrogen electrode 41 are supplied to the load (not shown).

Oxygen is supplied to the oxygen electrode 45, and the electrons are supplied via the load (not shown) to the oxygen electrode 45. The protons supplied through the proton-conducting film 43, the electrons supplied from the oxygen electrode 45 and the oxygen supplied from the outside combine due to the action of the catalyst, thus generating water. The water discharged to the outside by the way of the oxygen electrode 45. Thus, an electromotive force can be generated between the hydrogen electrode 41 and the oxygen electrode 45.

The hydrogen supplied to the hydrogen electrode 41 is prevented from reaching the oxygen electrode 45, by the proton-conducting film 43 containing fullerenol and the sheet 44 made of polypropylene. As a result, the hydrogen concentration at the oxygen electrode 45 can be maintained at about 3000 ppm or less, preferably about 1000 ppm or less, or more preferably about 100 ppm or less. This can effectively suppress the same reaction at the catalyst near the oxygen electrode film 45, as at the hydrogen electrode film 2. That is, the catalyst 9 can efficiently prevent hydrogen from decomposing into protons and electrons.

Figure 16:
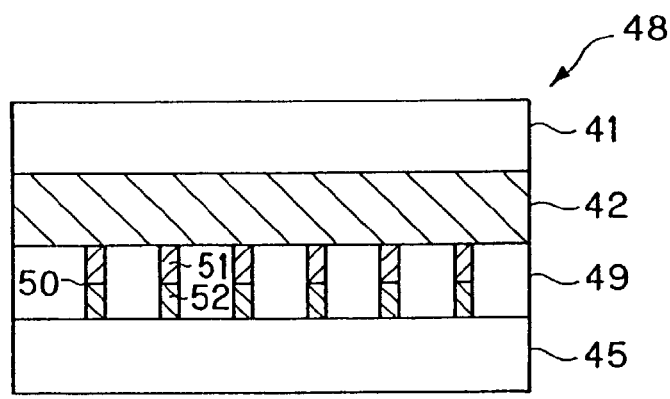
FIG. 16 is a sectional view depicting a further example of the electric energy generating apparatus according to an embodiment of the present invention.

FIG. 16 shows further electric energy generating apparatus 48 according to the invention. The electric energy generating apparatus 48 shown in FIG. 16 includes a hydrogen electrode 41 made of carbon sheet, a catalyst layer 42 contains a catalyst including platinum, a sheet 40 made of polypropylene, and an oxygen electrode 45 formed of a carbon sheet. The sheet 44 made of polypropylene has many holes 50. The holes 50 are filled with proton-conducting material 51 containing fullerenol and catalyst 52 containing platinum. The proton-conducting material 51 contacts the catalyst layer 42. The catalyst 52 contacts the oxygen electrode 45. The proton-conducting material 51 and the catalyst 52 contact each other in the holes 50.

The electric energy generating apparatus 48 thus configured is shielded within a container (not shown). To generate electric energy, hydrogen and oxygen are supplied to the hydrogen electrode 41 and the oxygen electrode 45, respectively. Preferably, the hydrogen may be released from hydrogen-occluding carbonaceous material (not shown) or hydrogen-occluding alloy (not shown, either) and applied to the hydrogen electrode 41. The oxygen can be supplied to the oxygen electrode 45 by supplying air.

The hydrogen supplied to the hydrogen electrode 41 is decomposed into protons and electrons, by virtue of the catalyst contained in the catalyst layer 42. The protons are supplied to the catalyst 52 filled in the numerous holes 50 of the sheet 49, through the proton-conducting material 51 filled in the numerous holes 50 of the sheet 40. The electrons are collected at the electrode 41. The electrons collected at the hydrogen electrode 41 are supplied to the load (not shown).

Oxygen is supplied to the oxygen electrode 45, and the electrons are supplied via the load (not shown) to the oxygen electrode 45. The protons supplied through the proton-conducting film 51, the electrons supplied from the oxygen electrode 45 and the oxygen supplied from the outside combine by virtue of the catalyst 52, thus generating water. The water discharged to the outside by the way of the oxygen electrode 45. Thus, an electromotive force can be generated between the hydrogen electrode 41 and the oxygen electrode 45.

The hydrogen supplied to the hydrogen electrode 41 is prevented from reaching the oxygen electrode 45, by the proton-conducting material 51 containing fullerenol and the sheet 40 made of polypropylene. As a result, the hydrogen concentration at the oxygen electrode 45 can be maintained at about 3000 ppm or less, preferably about 1000 ppm or less, or more preferably about 100 ppm or less. This can effectively suppress the reaction at the catalyst near the oxygen electrode film 45, i.e., decomposition of hydrogen into protons and electrons. The electric energy generating apparatus can therefore perform its function.

Figure 17:
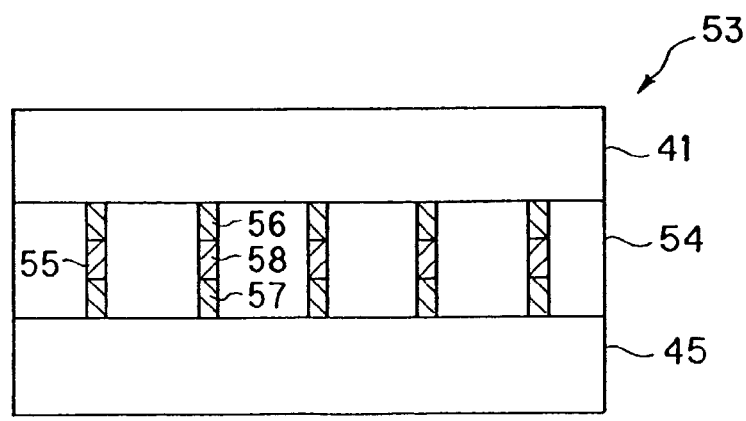
FIG. 17 is a sectional view showing another example of the electric energy generating apparatus according to an embodiment of the present invention.

FIG. 17 shows another electric energy generating apparatus 53 according to this invention. The electric energy generating apparatus 53 shown in FIG. 17 includes a hydrogen electrode 41 formed of a carbon sheet, a sheet 54 made of polypropylene, and an oxygen electrode 45 formed of a carbon sheet.

The sheet 54 made of polypropylene has many holes 55. The holes 55 are filled with catalysts 56 and 57 containing platinum and proton-conducting material 58 containing fullerenol. In the holes 55, the proton-conducting material 58 is held between the catalysts 56 and 57 and contact these catalysts, as is illustrated in FIG. 17. The catalysts 56 and 57 contact the hydrogen electrode 41 and the oxygen electrode 45, respectively.

The electric energy generating apparatus 53 thus configured is shielded within a container (not shown). To generate electric energy, hydrogen and oxygen are supplied to the hydrogen electrode 41 and the oxygen electrode 45, respectively. Preferably, the hydrogen may be released from hydrogen-occluding carbonaceous material (not shown) or hydrogen-occluding alloy (not shown, either) and applied to the hydrogen electrode 41. The oxygen can be supplied to the oxygen electrode 45 by supplying air.

More precisely, the hydrogen supplied to the hydrogen electrode 41 is decomposed into protons and electrons, by virtue of the catalyst 56. The protons are supplied to the catalyst 57 via the proton-conducting material 58. The electrons are collected at the electrode 41. The electrons collected at the hydrogen electrode 41 are supplied to the load (not shown).

Oxygen is supplied to the oxygen electrode 45, and the electrons are supplied via the load (not shown) to the oxygen electrode 45. The protons supplied through the proton-conducting film 58, the electrons supplied from the oxygen electrode 45 and the oxygen supplied from the outside combine by virtue of the catalyst 57, thus generating water. The water discharged to the outside by the way of the oxygen electrode 45. An electromotive force can thereby be generated between the hydrogen electrode 41 and the oxygen electrode 45.

The hydrogen supplied to the hydrogen electrode 41 is prevented from reaching the oxygen electrode 45, by the proton-conducting material 58 containing fullerenol and the sheet 54 made of polypropylene. As a result, the hydrogen concentration at the oxygen electrode 45 can be maintained at about 3000 ppm or less, preferably about 1000 ppm or less, or more preferably about 100 ppm or less. This can effectively suppress the reaction at the catalyst near the oxygen electrode 45, i.e., decomposition of hydrogen into protons and electrons. The electric energy generating apparatus can therefore perform its function.

Figure 18:
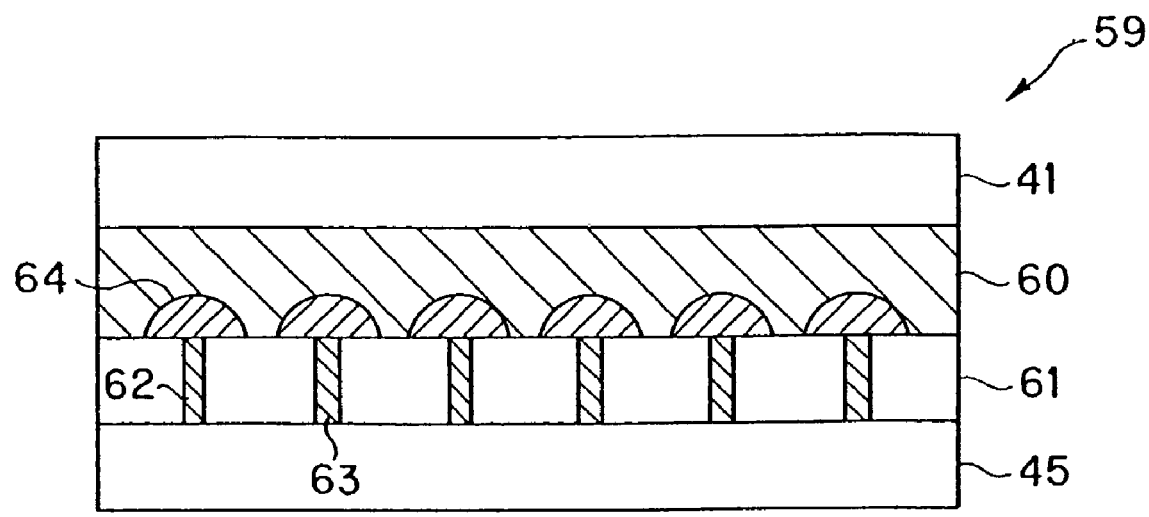
FIG. 18 is a sectional view illustrating another example of the electric energy generating apparatus according to an embodiment of the present invention.

FIG. 18 shows a further electric energy generating apparatus 59 according to an embodiment of the present invention. The electric energy generating apparatus 59 shown in FIG. 18 includes a hydrogen electrode 41 formed of a carbon sheet, a catalyst layer 60 containing a platinum-containing catalyst, a sheet 61 made of polypropylene, and an oxygen electrode 45 formed of a carbon sheet. The sheet 61 made of polypropylene has many holes 62. The holes 62 are filled with catalyst 63 that contains platinum. Proton-conducting members 64, each containing fullerenol, are provided on the sheet 61 and close the holes 62.

The electric energy generating apparatus 59 thus configured is shielded within a container (not shown). To generate electric energy, hydrogen and oxygen are supplied to the hydrogen electrode 41 and the oxygen electrode 45, respectively. Preferably, the hydrogen may be released from hydrogen-occluding carbonaceous material (not shown) or hydrogen-occluding alloy (not shown, either) and applied to the hydrogen electrode 41. The oxygen can be supplied to the oxygen electrode 45 by supplying air.

The hydrogen supplied to the hydrogen electrode 41 is decomposed into protons and electrons, by virtue of the catalyst 60. The protons are supplied to the catalyst 57 filled in the numerous holes 62 made in the sheet 61 via the proton-conducting members 64. The electrons are collected at the hydrogen electrode 41. The electrons collected at the hydrogen electrode 41 are supplied to the load (not shown).

Oxygen is supplied to the oxygen electrode 45, and the electrons are supplied via the load (not shown) to the oxygen electrode 45. The protons supplied through the proton-conducting film 64, the electrons supplied from the oxygen electrode 45 and the oxygen supplied from the outside combine by virtue of the catalyst 62, thus generating water. The water discharged to the outside by the way of the oxygen electrode 45. An electromotive force can thereby be generated between the hydrogen electrode 41 and the oxygen electrode 45.

The hydrogen supplied to the hydrogen electrode 41 is prevented from reaching the oxygen electrode 45, by the proton-conducting members 64 containing fullerenol and the sheet 61 made of polypropylene. As a result, the hydrogen concentration at the oxygen electrode 45 can be maintained at about 3000 ppm or less, preferably about 1000 ppm or less, or more preferably about 100 ppm or less. This can effectively suppress the reaction at the catalyst 62 near the oxygen electrode 45, i.e., decomposition of hydrogen into protons and electrons. The electric energy generating apparatus can therefore perform its function.

Figure 19:
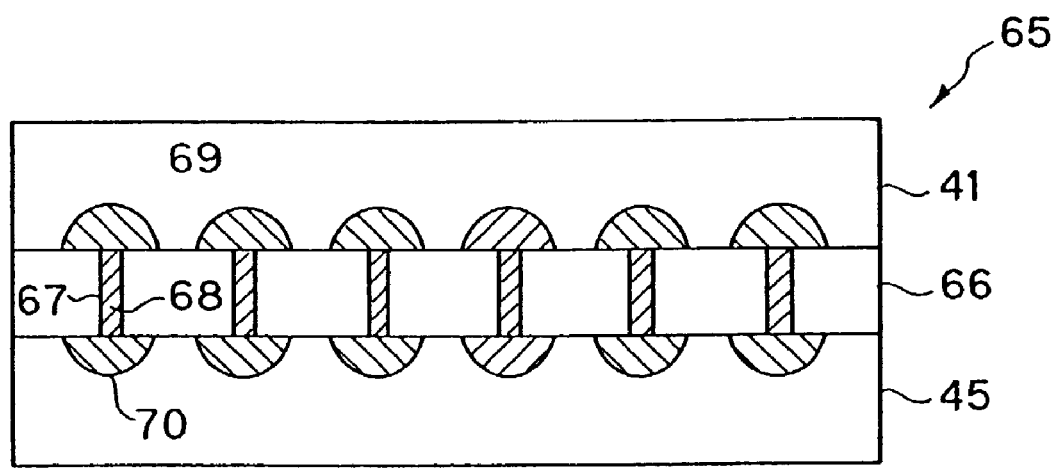
FIG. 19 is a sectional view showing another example of the electric energy generating apparatus according to an embodiment of the present invention.

FIG. 19 shows a further electric energy generating apparatus 65 according to the present invention. The electric energy generating apparatus 65 shown in FIG. 19 comprises a hydrogen electrode 41 formed of a carbon sheet, a sheet 66 made of polypropylene, and an oxygen electrode 45 formed of a carbon sheet. The sheet 66 made of polypropylene has many holes 67. The holes 67 are filled with proton-conducting material 68 that contains fullerenol. Seals 69, each made of a catalyst containing platinum, are provided on one surface of the sheet 66 and close the holes 67. Further, seals 70, each made of the catalyst containing platinum, are provided on the other surface of the sheet 66 and close the holes 67.

The electric energy generating apparatus 65 thus configured is shielded within a container (not shown). To generate electric energy, hydrogen is and oxygen is supplied to the hydrogen electrode 41 and the oxygen electrode 45, respectively. Preferably, the hydrogen may be released from hydrogen-occluding carbonaceous material (not shown) or hydrogen-occluding alloy (not shown, either) and applied to the hydrogen electrode 41. The oxygen can be supplied to the oxygen electrode 45 by supplying air.

The hydrogen supplied to the hydrogen electrode 41 is decomposed into protons and electrons, by virtue of the catalyst contained in the seals 69. The protons are supplied to the seals 70 through the proton-conducting material 68 filled in the numerous holes 67 made in the sheet 66. The electrons are collected at the electrode 41. The electrons collected at the hydrogen electrode 41 are supplied to the load (not shown).

Oxygen is supplied to the oxygen electrode 45, and the electrons are supplied via the load (not shown) to the oxygen electrode 45. The protons supplied through the proton-conducting material 68, the electrons supplied from the oxygen electrode 45 and the oxygen supplied from the outside combine by virtue of the catalyst contained in the seals 70, thus generating water. The water discharged to the outside by the way of the oxygen electrode 45. An electromotive force can thereby be generated between the hydrogen electrode 41 and the oxygen electrode 45.

The hydrogen supplied to the hydrogen electrode 41 is prevented from reaching the oxygen electrode 45, by the proton-conducting material 68 containing fullerenol and the sheet 66 made of polypropylene. As a result, the hydrogen concentration at the oxygen electrode 45 can be maintained at about 3000 ppm or less, preferably about 1000 ppm or less, or more preferably about 100 ppm or less. This can effectively suppress the reaction at the catalyst 62 near the oxygen electrode 45, i.e., decomposition of hydrogen into protons and electrons. The electric energy generating apparatus can therefore perform its function.

The present invention is not limited to the embodiments described above. Various changes and modifications can be achieved without departing from the spirit and scope of the present invention.

For example, the sheets 11, 44, 40, 54, 61 and 66 used in the electric energy generating apparatuses of the invention are made of polypropylene. Nonetheless, they may be made of any other material that shields hydrogen. The material is not limited to polypropylene and may be, for example, polyethylene and/or the like.

The electric energy generating apparatus 1 shown in FIGS. 1 to 10 has a four-layered electrolyte film 4 that is composed of one sheet 11 and three proton-conducting films 12, 13 and 14. The film 4 may include an additional proton-conducting film, becoming a five-layered film. Moreover, the film 4 may be an electrolyte film composed of six layers or more.

In the electric energy generating apparatus 1 shown in FIGS. 1 to 10, the hydrogen electrode film 2 is a three-layered member composed of an electrode 5 made of a carbon sheet, a catalyst layer 6 containing a platinum-containing catalyst, and a proton-conducting film 7 containing fullerenol. The proton-conducting film 7 contains fullerenol. The oxygen electrode film 3 is a three-layered member, too, that is composed of an electrode 8 made of a carbon sheet, a catalyst layer 9 containing a platinum-containing catalyst, and a proton-conducting film 10 containing fullerenol. The hydrogen electrode film 2 and the oxygen electrode film 3 are not limited to these structures. For example, the proton-conducting film 7 of the hydrogen electrode film 2 and/or the proton-conducting film 10 of the oxygen electrode film 3 may not be used at all.

In the electric energy generating apparatuses 1, 40, 48, 53, 59 and 65 according to an embodiment of the present invention, the electrodes are made of carbon sheets. The material of the electrodes is not limited to carbon. Rather, the electrodes may be made of, for example, metal.

In the electric energy generating apparatuses 1, 40, 48, 53, 59 and 65 according to and embodiment of the present invention, a catalyst containing platinum is used. The catalyst is not limited to a platinum-containing one. Other catalysts, including one that contains a platinum alloy, can be preferably utilized.

The electric energy generating apparatuses 1, 40, 48, 53, 59 and 65 according to an embodiment of the present invention have one sheet each. More correctly, they have a sheet 11, a sheet 44, a sheet 49, a sheet 54, a sheet 61 and a sheet 66, respectively. Nonetheless, each apparatus may have two or more sheets.

In the electric energy generating apparatus shown in FIG. 14, the electrolyte film 38 is a three-layered member composed of two proton-conducting films 12 and 13 and one porous film 39 sandwiched between the films 12 and 13. The electrolyte film 38 need not be a three-layered member. It may further include an additional proton-conducting film, to constitute a four-layered member. Conversely, the proton-conducting film 12 and/or the proton-conducting film 13 may not be used. In this case, the electrolyte film 38 is a one-layered member or a two-layered member.

The electric energy generating apparatuses 1, 40, 48, 53, 59 and 65 according to an embodiment of the present invention have sheets 11, 44, 40, 54, 61 and 66, respectively. The holes 15, holes 46, holes 50, holes 55, holes 62 and holes 67 made in these sheets are filled with proton-conducting film and/or catalyst. Nonetheless, the holes need not be completely filled with proton-conducting film and/or catalyst. A void may remain in each hole.

Moreover, in the electric energy generating apparatuses 1, 40, 48, 53, 59 and 65 of this invention, hydrogen and oxygen are supplied to the first electrode and the second electrode, respectively, thereby to generate electric energy. Instead, oxygen and hydrogen may be supplied to the first electrode and the second electrode, respectively, thereby to generate electric energy.

A mixture solution of fullerenol and tetrahydrofuran is applied in the process of forming the electrolyte film 4, illustrated in FIGS. 4 to 7. The mixture solution contains 33% by weight of fullerenol. The concentration of fullerenol is not limited to 33% by weight, nonetheless. The concentration may be 25 to 60% by weight, preferably 33 to 50% by weight.

Furthermore, in the process of forming the electrolyte film 4, illustrated in FIGS. 4 to 7, a glass rod 23 is rolled on the sheet 11, coating the sheet 11 with the mixture solution of fullerenol and tetrahydrofuran, thereby forming a proton-conducting film 13 on the sheet 11. The method of forming the proton-conducting film 13 on the sheet 11 is not limited to this. Any other method, such as spray coating, screen printing or sol-gel process, may be employed to form the film 13.

INDUSTRIAL APPLICABILITY

As has been described above, the present invention can provide an electric energy generating apparatus having a hydrogen-electrode film and an oxygen-electrode film to which hydrogen and oxygen are supplied, respectively, and designed to generate a desired electromotive force.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An electric energy generating apparatus comprising:
a hydrogen electrode film wherein hydrogen is supplied thereto;
an oxygen electrode film wherein oxygen is supplied thereto; and
an electrolyte film interposed between the hydrogen electrode film and the oxygen electrode film, wherein a concentration of hydrogen at the oxygen electrode film is at most about 3000 ppm when hydrogen is supplied to the hydrogen electrode film, wherein the hydrogen electrode film comprises a layer containing a catalyst which decomposes at least the hydrogen supplied, into protons and electrons, and an electrode at which the electrons are collected, wherein the electrolyte film comprises a proton-conducting film which allows passage of at least the protons, wherein the proton-conducting film is capable of suppressing passage of hydrogen, and wherein the proton-conducting film contains fullerenol.

* * * * *